(12) United States Patent  
Verner et al.

(10) Patent No.: US 8,853,563 B2
(45) Date of Patent: Oct. 7, 2014

(54) COLD SHRINK ASSEMBLY

(75) Inventors: Dennis Verner, Leechburg, PA (US); Stanley Szyszko, Long Valley, NJ (US)

(73) Assignee: Thomas & Betts International, LLC, Wilmington, DE (US)

( * ) Notice: Subject to any disclaimer, the term of this patent is extended or adjusted under 35 U.S.C. 154(b) by 651 days.

(21) Appl. No.: 13/085,691

(22) Filed: Apr. 13, 2011

(65) Prior Publication Data

US 2011/0254197 A1 Oct. 20, 2011

Related U.S. Application Data

(60) Provisional application No. 61/324,869, filed on Apr. 16, 2010.

(51) Int. Cl.
*H01R 4/70* (2006.01)

(52) U.S. Cl.
USPC ........... 174/500; 174/84 R; 403/273; 439/521

(58) Field of Classification Search
CPC ....... H01R 13/5216; H01R 4/70; A47B 21/06
USPC .................. 174/500, 84 R; 403/273; 439/521
See application file for complete search history.

(56) References Cited

U.S. PATENT DOCUMENTS

| 3,717,717 | A | 2/1973 | Cunningham et al. |
| 4,135,587 | A | 1/1979 | Diaz |
| 4,304,616 | A | 12/1981 | Richardson |
| 4,421,945 | A | 12/1983 | Moisson |
| 4,455,041 | A | 6/1984 | Martin |
| 4,487,994 | A | 12/1984 | Bahder |
| 4,506,430 | A | 3/1985 | Guzay, Jr. |
| 4,639,546 | A | 1/1987 | Meltsch |
| 4,736,072 | A | 4/1988 | Hvidsten |
| 4,874,193 | A | 10/1989 | Martin |
| 4,951,978 | A | 8/1990 | Martin |
| 5,087,492 | A | 2/1992 | Vallauri et al. |
| 5,098,752 | A | 3/1992 | Chang et al. |
| 5,215,607 | A | 6/1993 | Read et al. |
| 5,248,169 | A | 9/1993 | Barbe et al. |
| 5,313,019 | A | 5/1994 | Brusselmans et al. |
| 5,406,871 | A | 4/1995 | Lambert, Jr. |
| 5,446,241 | A | 8/1995 | Mackaness |

(Continued)

FOREIGN PATENT DOCUMENTS

| CA | 2062663 | 9/1992 |
| EP | 1006632 | 6/2000 |
| WO | 2012/083984 | 6/2012 |

*Primary Examiner* — Forrest M Phillips
(74) *Attorney, Agent, or Firm* — Snyder, Clark, Lesch & Chung, LLP

(57) ABSTRACT

A cold shrink assembly includes a first member, a second member and insulating material disposed over the first and second members. The first member may include first and second portions that are coupled together and configured to be separable from each other, where the first and second portions forming a main body having curved portions extending from the main body. The second member may include third and fourth portions that are coupled together and configured to be separable from each other, where the third and fourth portions form a receiving portion located at a second end of the second member. The receiving portion may be configured to secure the curved portions of the first member to the receiving portion when the first and second members are in a first position, and release the curved portions from the receiving portion when the first and second members are in a second position.

20 Claims, 14 Drawing Sheets

(56) References Cited

U.S. PATENT DOCUMENTS

| | | |
|---|---|---|
| 5,467,515 A | 11/1995 | Luzzi |
| 5,492,740 A | 2/1996 | Vallauri et al. |
| 5,560,969 A | 10/1996 | Portas |
| 5,570,497 A | 11/1996 | Luzzi |
| 5,577,310 A | 11/1996 | Cheenne-Astorino et al. |
| 5,683,273 A | 11/1997 | Garver et al. |
| 5,753,861 A | 5/1998 | Hansen et al. |
| 5,801,332 A | 9/1998 | Berger et al. |
| 5,844,170 A | 12/1998 | Chor et al. |
| 5,922,423 A | 7/1999 | Jeremko |
| 6,103,975 A | 8/2000 | Krabs et al. |
| 6,472,600 B1 | 10/2002 | Osmani |
| 6,796,820 B2 | 9/2004 | Jazowski et al. |
| 6,948,976 B2 | 9/2005 | Goodwin et al. |
| 6,991,484 B2 | 1/2006 | Luzzi |
| 7,431,599 B2 | 10/2008 | Luzzi |
| 7,511,222 B2 | 3/2009 | Taylor et al. |
| 7,767,909 B2 | 8/2010 | Krabs et al. |
| 7,838,770 B2 | 11/2010 | Portas et al. |
| 8,119,193 B2 | 2/2012 | Vallauri et al. |
| 8,273,200 B2 | 9/2012 | Portas et al. |
| 2003/0124285 A1 | 7/2003 | Hopcus et al. |
| 2004/0262025 A1 | 12/2004 | Brandt et al. |
| 2005/0269124 A1 | 12/2005 | Suzuki et al. |
| 2007/0275194 A1 | 11/2007 | Suzuki et al. |
| 2014/0090875 A1 | 4/2014 | Hernandez et al. |

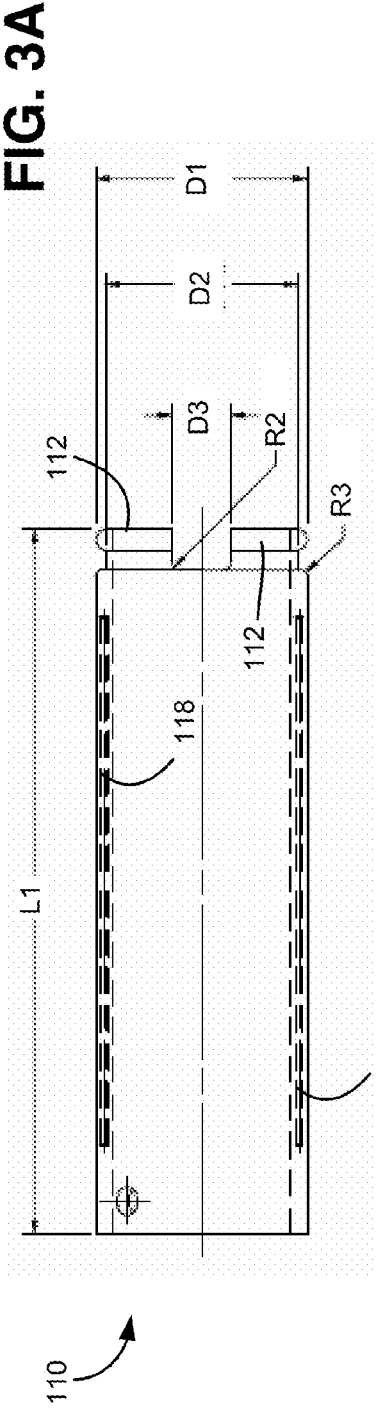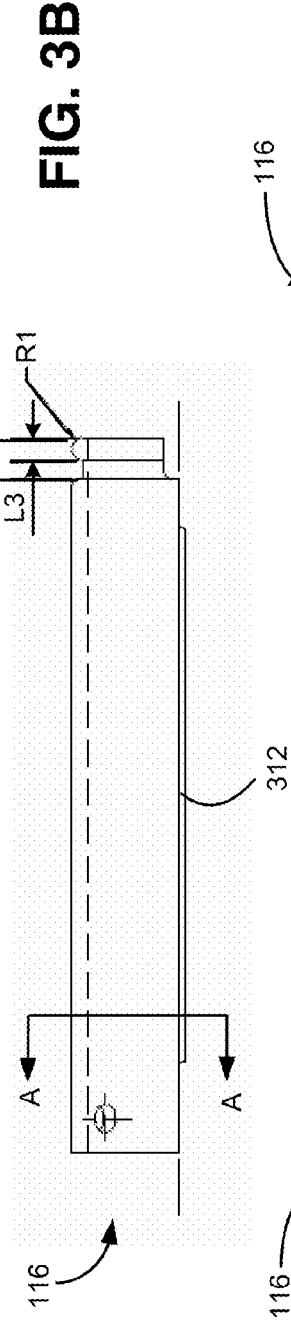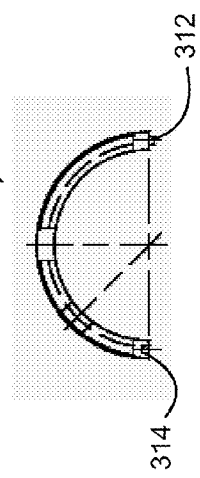

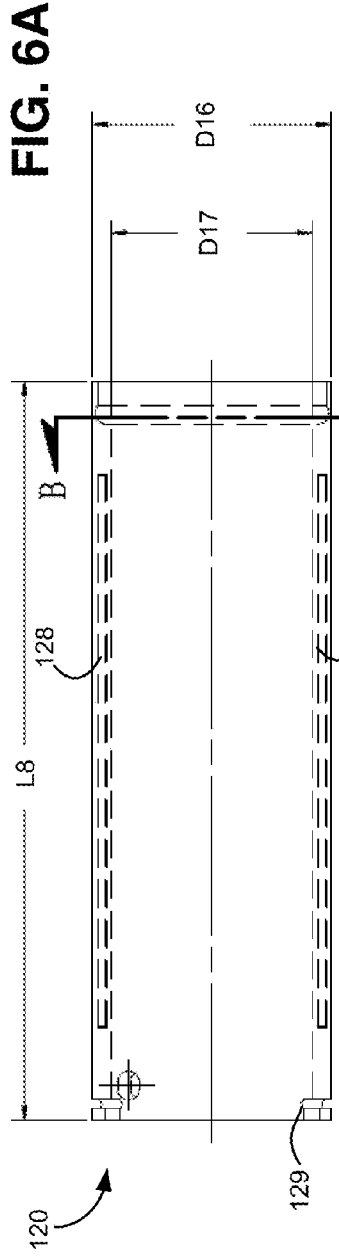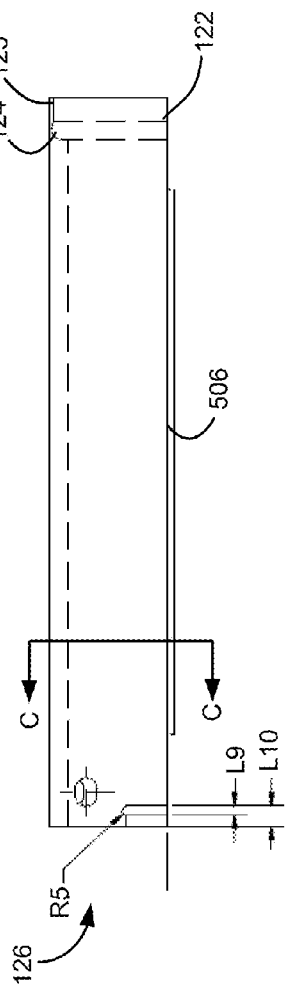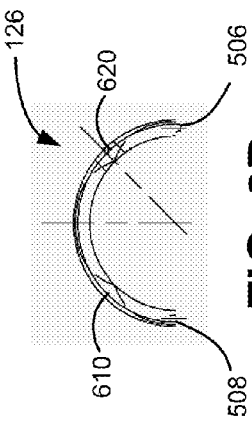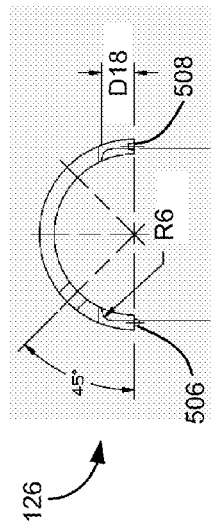

COLD SHRINK ASSEMBLY

RELATED APPLICATION

This application claims priority under 35 U.S.C. §119 based on U.S. Provisional Patent Application No. 61/324,869 filed Apr. 16, 2010, the disclosure of which is hereby incorporated herein by reference.

BACKGROUND INFORMATION

Cold shrink products are typically used to insulate electrical wires and/or electrical splices. For example, one conventional cold shrink product includes a plastic core, a pull tab and insulating material formed over the plastic core. An installer may slide the plastic core over an electrical cable to the location of the splice and pull the pull tab to unwind the plastic core. The insulating material then contracts over the electrical wires/splice. One drawback with such cold shrink products is that the pull cord often gets stuck inside the splice. As a result, it is often difficult to unwind and remove the plastic core to properly insulate the wires/splice.

Another conventional cold shrink product includes a plastic tube that must be cracked to get it apart and removed from the electrical cable after the insulating material is disposed over the splice. Taking apart such a device may be time consuming and difficult in certain circumstances.

BRIEF DESCRIPTION OF THE DRAWINGS

FIG. 3A is a side view of the male portion of the cold shrink core of FIG. 1;

FIG. 3B is a side view of a portion of the male portion illustrated in FIG. 3A;

FIGS. 3C and 3D are sectional views of the portion of the male portion illustrated in FIG. 3B;

FIG. 6A is a side view of the female portion of the cold shrink core of FIG. 1;

FIG. 6B is a side view of a portion of the female portion illustrated in FIG. 6A;

FIGS. 6C, 6D and 6E are sectional views of the portion of the female portion illustrated in FIG. 6B;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein provide a cold shrink assembly that may be used to install electrical insulation over electrical wires or a splice. In an exemplary implementation, the cold shrink assembly may include two cores that may be interlocked. When the cold shrink material is ready to be installed, the cores are placed (e.g., slid) onto an electrical cable and moved to a location at which the cold shrink material will be deposited. One of the two cores may then be rotated with respect to the other core, resulting in separation and movement of the two cores and the depositing of the cold shrink material at the desired location (e.g., the splice). The insulating material then contracts over the splice/wires. In one implementation, each of the two cores includes two halves that may be separated from each other and easily removed from the cable after the cold shrink material is deposited.

Figure 1:
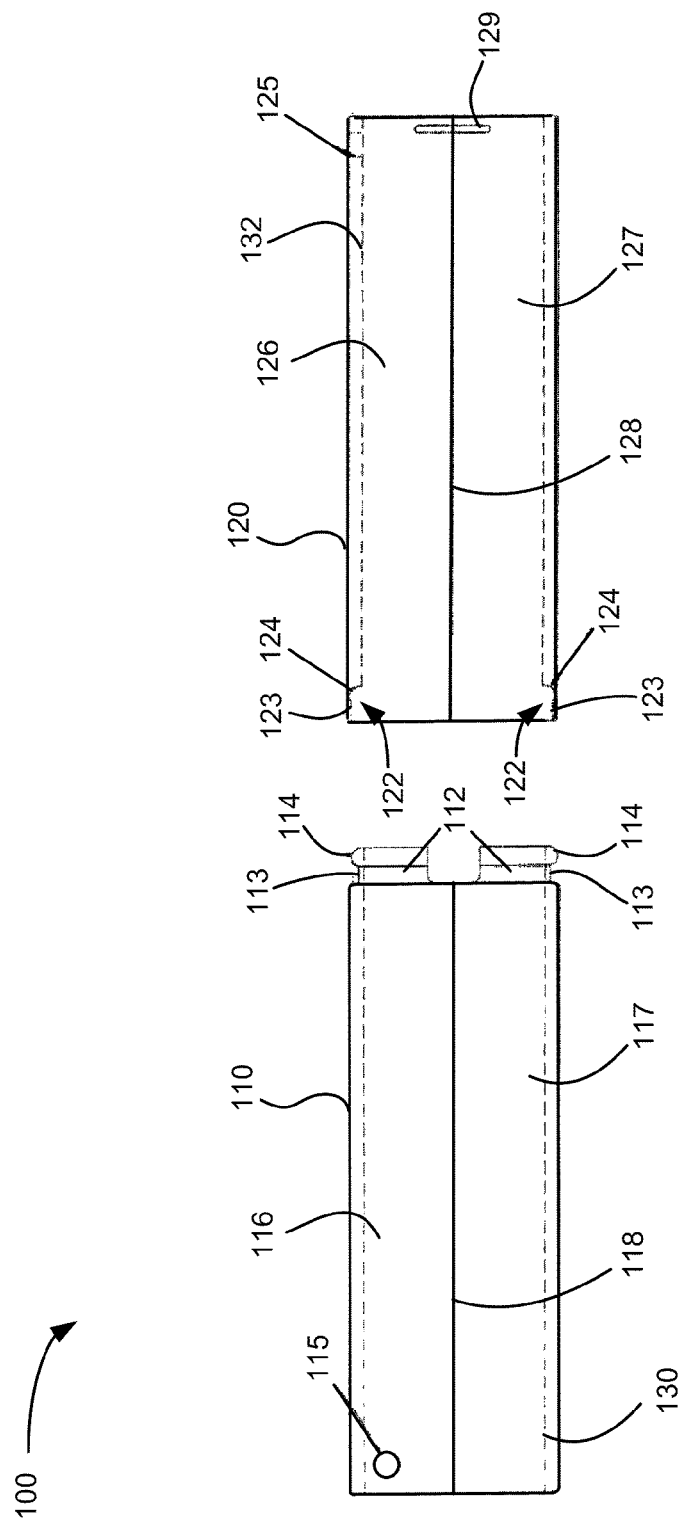
FIG. 1 is a side view of exemplary male and female portions of a cold shrink core in an unconnected configuration consistent with an exemplary implementation.

FIG. 1 is a side view of two portions of a cold shrink core 100 in an unconnected configuration, in accordance with an exemplary implementation. Referring to FIG. 1, cold shrink core 100 may include two portions, identified as 110 and 120. Portion 110 (also referred to herein as male portion 110 or male side 110) and portion 120 (also referred to herein as female portion 120 or female side 120) may each be substantially cylindrical and may be made of plastic. In an exemplary implementation, portions 110 and 120 may also be hollow. It should be understood that sides 110 and 120 may have other cross-sectional shapes (e.g., hexagonal, octagonal, etc.) and may be made of other materials, such as metal (e.g., aluminum), polymers, composite materials, rubber, etc.

In an exemplary implementation, male side 110 may include four extensions 112 (two shown in FIG. 1; also referred to as fingers 112) that project or extend from one end of male portion 110. Fingers 112 may be spaced apart radially around the circumference of male side 110. Fingers 112 may include a relatively straight portion 113 (also referred to herein as neck 113) that extends from the main body of male side 110 and a curved portion 114. In an exemplary implementation, neck 113 extends in manner that is substantially parallel to the sides of the main body of male side 110. Curved portion 114 may extend from neck 113 in a curved manner and may extend further in the radial direction from the center of male side 110 than neck 113, as illustrated in FIG. 1. Fingers 112 may be received and secure by female side 120, as described in detail below.

Male side 110 may also include a positioning hole 115 that is located relatively close to the end of side 110 located opposite fingers 112. Positioning hole 115 may be used to aid in aligning male side 110 with female side 120 when disconnecting the two sides from one another.

In an exemplary implementation, male side 110 may be comprised of two separate parts or halves that interlock. For example, male side 110 may include a first half 116 and a second half 117 that are connected to each other at area 118 (also referred to herein as interconnection or interconnection area 118). A similar interconnection area 118 may be located on male side 110 on the opposite side of the circumference of male side 110. These interconnections 118 may permit first half 116 and second half 117 to be easily removed from, for example, a cable. Interconnections 118 will be described in more detail below Female side 120 may include a receiving portion 122 (also referred to herein as rim 122) that is configured to receive fingers 112. For example, rim 122 may include a first portion 123 that extends inwardly from the sides of female side 120 and a curved portion 124 that extends further inwardly in the radial direction, as illustrated in FIG. 1. The curved portion 114 of fingers 112 may be received by curved portion 124 of rim 122. Neck 113 of fingers 112 may be received by portion 123. As described below, rim 122 may also include raised areas or cam portions (also referred to herein as cams) located around the circumference of rim 122. When male side 110 is connected to female side 120, the cams aid in securing fingers 112 to rim 122. When male side 110 and female side 120 are to be disconnected from each other, female side 120 may be rotated and the cams act to push fingers 112 inwardly to release sides 110 and 120 from each other, as described in more detail below.

Female side 120 may also include a positioning hole 125, similar to positioning hole 115, that aids in aligning female side 120 to male side 110 when connecting the two sides. Positioning hole 125 in FIG. 1 is shown oriented with respect to male side 110 in a connected position. For example, in one implementation, when positioning hole 125 is not radially aligned with positioning hole 115 (e.g., 10-20 degrees offset), male side 110 may be locked or secured to female side 120.

In an exemplary implementation, female side 120 may be comprised of two separate parts or halves that interlock, similar to male side 110. For example, female side 120 may include a first half 126 and a second half 127 that are connected at area 128 (also referred to herein as interconnection or interconnection area 128). A similar interconnection 128 may be located on female side 120 on the opposite side of the circumference of female side 120. These interconnections 128 may permit first half 126 to be easily removed from second half 127 when removing cold shrink core 100 from, for example, a cable. Interconnections 128 will be described in more detail below.

Female side 120 may also include two slots 129 (one shown in FIG. 1). In some implementations, male side 110 may include similar slots. Slots 129 may be used to receive straps, such as Velcro straps, that may be used to hold female side 120 to the cold shrink material (not shown in FIG. 1). For example, the straps may allow a technician to position the cold shrink material over a splice after male side 110 is separated from female side 120, as described in more detail below.

As described above, male portion 110 and female portion 120 may be hollow cores. Dotted lines 130 and 132 in FIG. 1 represent the inner surfaces of male and female portions 110 and 120, in such an implementation.

Figure 2:
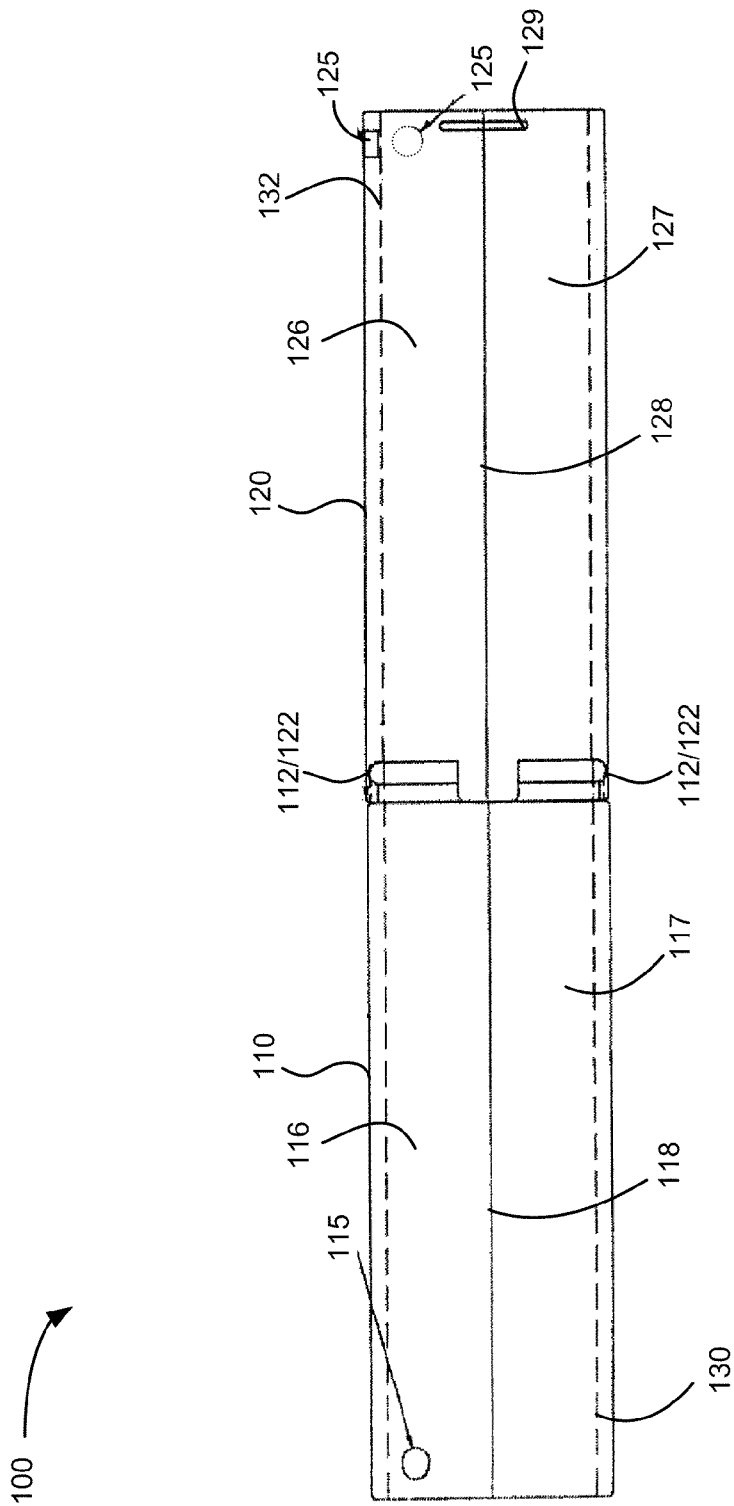
FIG. 2 is a side view of the male and female portions of the cold shrink core of FIG. 1 in a connected configuration according to an exemplary implementation.

FIG. 2 is a side view of cold shrink core 100 in a connected configuration consistent with an exemplary implementation. Referring to FIG. 2, fingers 112 are shown coupled to receiving portion 122. As illustrated, in the connected configuration, positioning holes 115 and 125 are not aligned. That is, positioning holes 115 and 125 may be radially located at different portions of the circumference of male portion 110 and female portion 120 with respect to interconnections 118 and 128, respectively. FIG. 2 also shows positioning hole 125 (dotted circle in FIG. 2) rotated such that positioning hole 125 is aligned with positioning hole 115 (e.g., radially located at approximately the same portion of the circumference of male portion 110 and female portion 120 with respect to connection areas 118 and 128, respectively). When positioning holes 115 and 125 are not aligned, fingers 112 are secured or held in place by receiving portion 122 of female portion 120, and when positioning holes 115 and 125 are aligned, fingers 112 are released by receiving portion 122, as described in more detail below. In an exemplary implementation, portions 110 and 120 may be connected as illustrated in FIG. 2 during fabrication, followed by placing cold shrink electrical insulation over at least a portion of cold shrink core 100.

FIG. 3A is another side view of male side 110 and FIG. 3B is a side view of half 116 of male side 110 consistent with an exemplary implementation. Referring to FIG. 3A, L1 may represent the length of male side 110 including fingers 112, L2 may represent the overall length of fingers 122, and L3 may represent the length of curved portion 114 of fingers 122. In an exemplary implementation, L1 may range from approximately 5.0 inches to approximately 9.0 inches, L2 may range from approximately 0.3 inches to 0.6 inches and L3 may range from approximately 0.2 inches to approximately 0.4 inches. In one particular implementation, L1 may be 5.0 inches, L2 may be 0.466 inches and L3 may be 0.25 inches. The dimensions described above with respect to L1-L3 are exemplary only. It should be understood that other dimensions may be used for L1-L3 based on the particular implementation.

Referring to FIG. 3A, D1 may represent the distance between the outer end of curved portion 114 of one finger 112 and the outer end of curved portion 114 of a neighboring or opposing finger 112, D2 may represent the distance between the outer side of neck 113 of one finger 112 and the outer side of neck 113 of a neighboring or opposing finger 112, and D3 may represent the distance between neighboring fingers 112. In an exemplary implementation, D1 may range from approximately 1.6 inches to approximately 3.1 inches, D2 may range from approximately 1.4 inches to 3.0 inches and D3 may range from approximately 0.4 inches to about 0.7 inches. In one particular implementation, D1 may be 1.619 inches, D2 may be 1.494 inches and D3 may be 0.686 inches. Similar to the discussion above with respect to L1-L3, the dimensions described above with respect to D1-D3 are exemplary only. It should be understood that other dimensions may be used for D1-D3 based on the particular implementation.

As illustrated in FIG. 3A, fingers 122 may be curved. In addition, the area where fingers 122 meet the main body of male side 110 may also be curved. For example, referring to FIGS. 3A and 3B, R1 represents the radius of curvature of curved portion 114, R2 represents the radius of curvature of the junction of fingers 112 and the inside portion of the main body 110 and R3 represents the radius of curvature of the junction between the end of the main body 110 and fingers 112. In an exemplary implementation, R1 may range from approximately 0.1 inches to approximately 0.2 inches, R2 may range from approximately 0.05 inches to 0.10 inches, and R3 may range from approximately 0.05 inches to about 0.10 inches. In one particular implementation, R1 may be 0.125 inches, R2 may be 0.093 inches and R3 may be 0.062 inches. Similar to the discussion above with respect to L1-L3 and D1-D3, the dimensions described above with respect to R1-R3 are exemplary only. It should be understood that other dimensions may be used for R1-R3 based on the particular implementation.

As described above, in an exemplary implementation, male side 110 may include two separable portions or halves 116 and 117 that fit together via connections 118. FIG. 3B illustrates half 116 of male portion 110 rotated 90 degrees with respect to the center line shown in FIG. 3A. Referring to FIG. 3B, half 116 may include extension 312 included in connection area 118 that extends from one side of half 116 along the majority of the length of half 116. The opposite side of half 116 may include a groove that runs the majority of the length of half 116, as illustrated by the second connection area 118 in FIG. 3A). For example, FIG. 3C illustrates a cross-section of half 116 taken along line AA in FIG. 3B. As illustrated, one side of half 116 includes extension 312 and the opposite side of half 116 includes groove 314. Extension 312 and groove 314 will mate with a corresponding groove and extension, respectively, included on half 117. Extensions 312 and groove 314 may also include angled sides that correspond to angled side in the mating groove and extension, as described in more detail below.

FIG. 3D illustrates a cross-sectional view of half 116 of FIG. 3B looking toward fingers 112. As illustrated, half 116 includes groove 314 and extension 312 that will mate with a corresponding extension and groove of half 117.

Figure 4A:
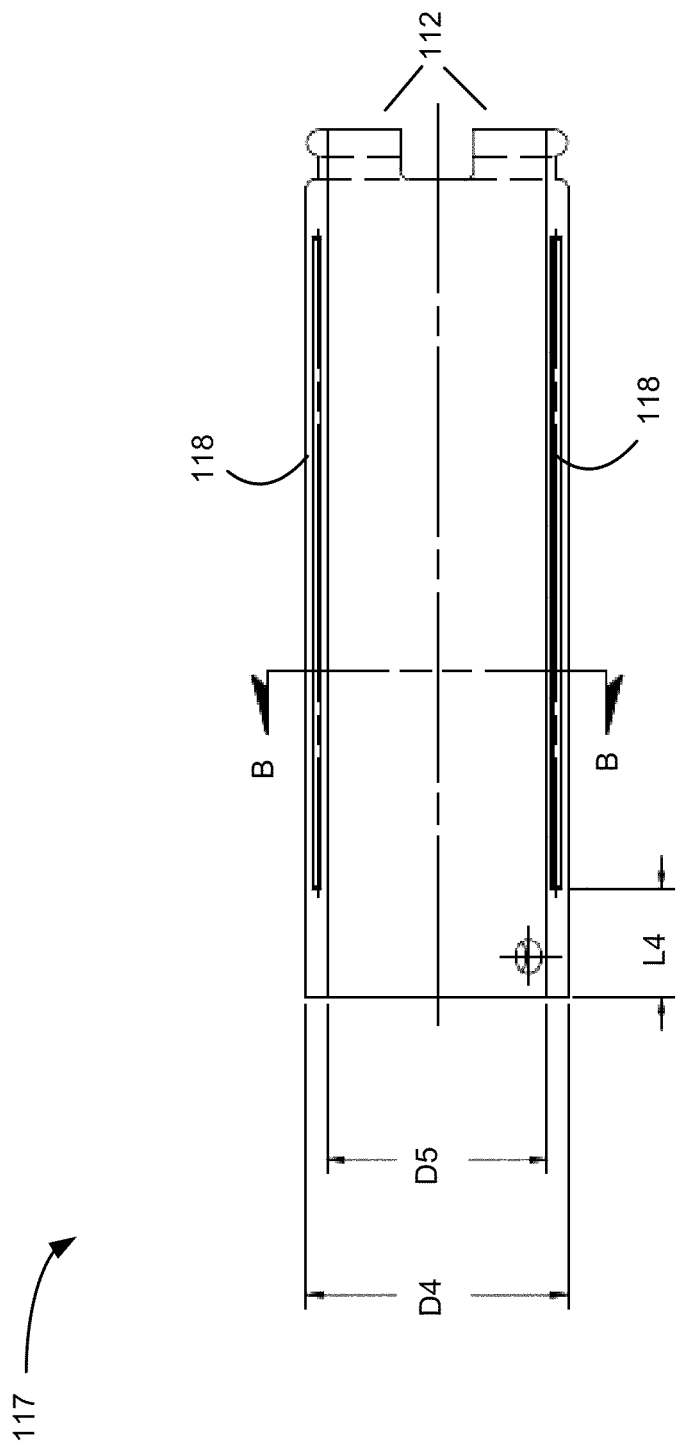
FIGS. 4A and 4B are a side view and a partial sectional view, respectively, of a portion of the male portion illustrated in FIG. 1.

FIG. 4A is a side view of half 117 of male portion 110 with the hollow inside of half 117 exposed. Referring to FIG. 4A, D4 represents the diameter of half 117 (as well as the diameter of male portion 110), D5 represents the inner diameter of half 117 and L4 represents the distance between the end of half 117 and the beginning of connection area 118. In an exemplary implementation, D4 may range from approximately 1.5 inches to approximately 3.5 inches, D5 may range from approximately 1.2 inches to 2.8 inches and L4 may range from approximately 0.5 inches to about 1.5 inches. In one particular implementation, D4 may be 1.664 inches, D5 may be 1.289 inches and L4 may be 1.0 inches. Similar to the discussion above with respect to FIGS. 3A-3D, the dimensions described above with respect to D4, D5 and L4 are exemplary only. It should be understood that other dimensions may be used for D4, D5, and L4 based on the particular implementation.

Figure 4B:
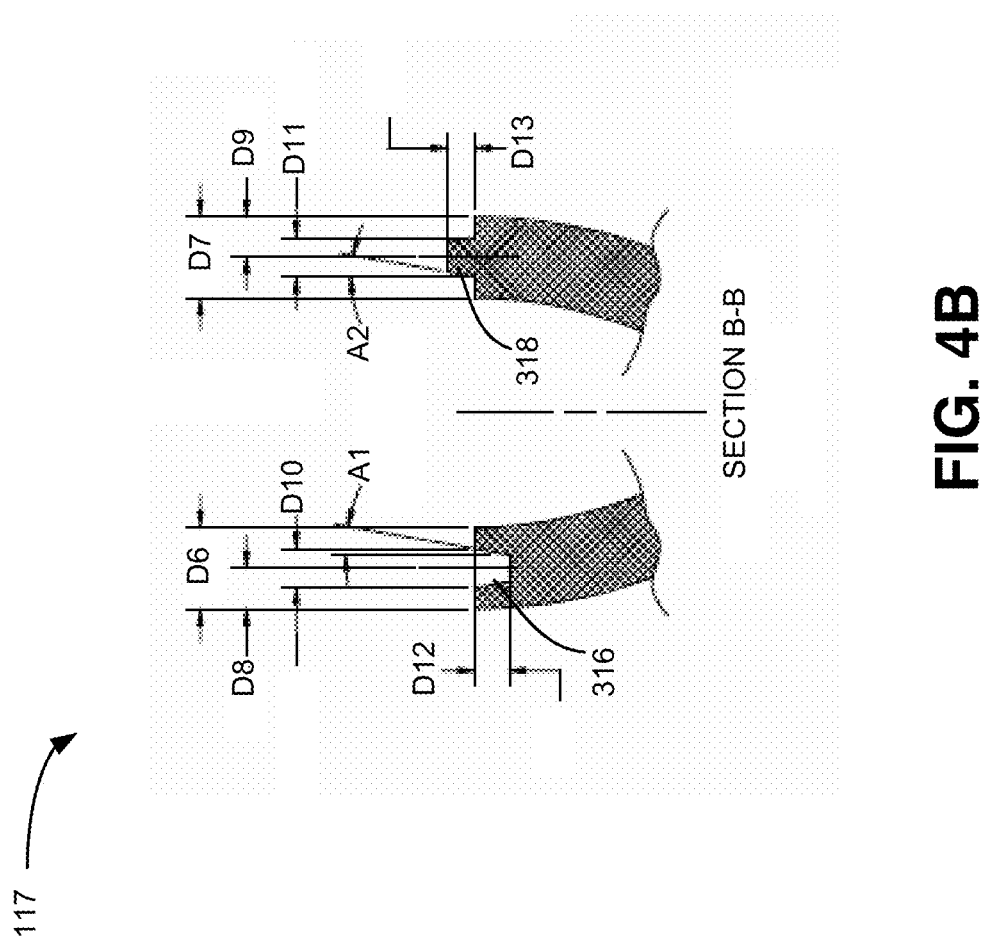

As discussed previously with respect to FIGS. 3C and 3D, halves 116 and 117 may be connected at connections areas 118 via extensions and corresponding grooves. FIG. 4B illustrates a partial cross-section of half 117 of FIG. 4A taken along BB. Referring to FIG. 4B, groove 316 may have a tapered or trapezoidal shape, with A1 representing the angle of the sides of the walls of groove 316 with respect to the vertical line illustrated in FIG. 4B. In an exemplary implementation, A1 may range from about 5 degrees to about 15 degrees. Correspondingly, extension 318 is similarly angled to have a trapezoidal shape as illustrated in FIG. 4B such that it can be received in groove 314 in half 116 (FIG. 3C), which is configured in a similar manner as groove 316. Therefore, A2, which represents the angle of the side walls of extension 318 with respect to the vertical line illustrated in FIG. 4B, may be equal to A1 and may range from about 5 degrees to about 15 degrees. In one implementation, A1 and A2 may be approximately 10 degrees.

Referring to FIG. 4B, D6 and D7 represent the width of the walls of half 117, D8 and D9 represent the distance from the outside wall of half 117 to the center of groove 316 and the center of extension 318, respectively, D10 and D11 represents the maximum width of groove 316 and extension 318, respectively, D12 represents the depth of groove 316, and D13 represents the height of extension 318. In an exemplary implementation, D6 and D7 may be equal to each other and may range from approximately 0.15 inches to 0.30 inches, D8 and D9 may be equal to each other and may range from approximately 0.05 inches to 0.15 inches, D10 and D11 may be equal to each other and may range from approximately 0.05 inches to 0.15 inches, D12 may range from approximately 0.05 inches to 0.10 inches and D13 may range from approximately 0.05 inches to 0.10 inches. In one exemplary implementation, D6 and D7 may be 0.187 inches, D8 and D9 may be 0.094 inches, D10 and D11 may be 0.090 inches, D12 may be 0.080 inches, and D13 may be 0.060 inches. Similar to the discussion above with respect to FIGS. 3A-3D, the dimensions described above with respect to D6-D13, A1 and A2 are exemplary only. It should be understood that other dimensions may be used for D6-D13, A1 and A2 based on the particular implementation. In addition, half 116 shown in FIGS. 3C and 3D may be configured in a manner similar to half 117. That is, extension 312 and groove 314 may be configured in a manner similar to extension 318 and groove 316, respectively. In addition, the dimensions with respect to extensions 312 and groove 314 and the side walls of half 116 may be the same as those discussed above with respect to their corresponding elements in half 117 discussed above in FIG. 4B.

As described above, extension 312 may fit in groove 316 and extension 318 may fit in groove 314. As a result, sides 116 and 117 may be secured to each other via friction in a dovetail like connection. These connections, however, may be easily separated when cold shrink core 100 is to be removed from an electrical cable after cold shrink material is deposited over a splice, as described in more detail below.

Figure 5A:
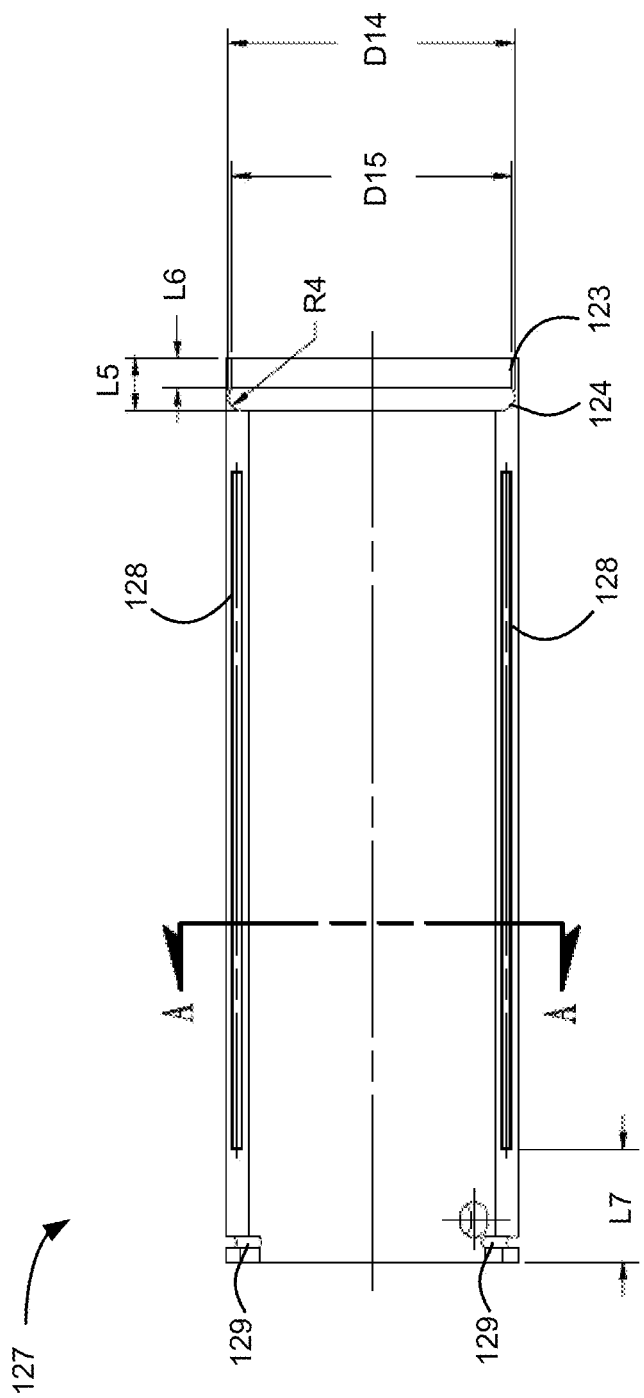
FIGS. 5A and 5B are a side view and a partial sectional view, respectively, of a portion of the female portion illustrated in FIG. 1.

FIG. 5A is a side view of half 127 of female portion 120 with the inside hollow portion exposed. Referring to FIG. 5A, D14 represents the diameter of half 127 (as well as the diameter of female portion 120), D15 represents the distance between portion 123 of one side of receiving portion 122 and portion 123 of the adjacent receiving portion 122. In an exemplary implementation, D14 may range from approximately 1.5 inches to approximately 3.5 inches and D15 may range from approximately 1.4 inches to 3.2 inches. In one particular implementation, D14 may be 1.619 inches, D15 may be 1.564 inches.

L5 may represent the overall length of receiving portion 122, L6 may represent the length of portion 123, L7 may represent the distance between the end of portion 127 and connection area 128, and R4 may represent the radius of curvature of curved portion 124. In an exemplary implementation, L5 may range from about 0.25 inches to 0.75 inches, L6 may range from approximately 0.2 inches to 0.5 inches and L7 may range from approximately 0.5 inches to 1.5 inches, and R4 may range from approximately 0.05 inches to 0.15 inches. In an exemplary implementation, L5 may be 0.466 inches, L6 may be 0.265 inches, L7 may be 1.0 inches, and R4 may be 0.125 inches. Similar to the discussion above with respect to FIGS. 3A-4B, the dimensions described above with respect to female side 120 are exemplary only. It should be understood that other dimensions may be used for D14, D15, L5-L7 and R4 based on the particular implementation.

Figure 5B:
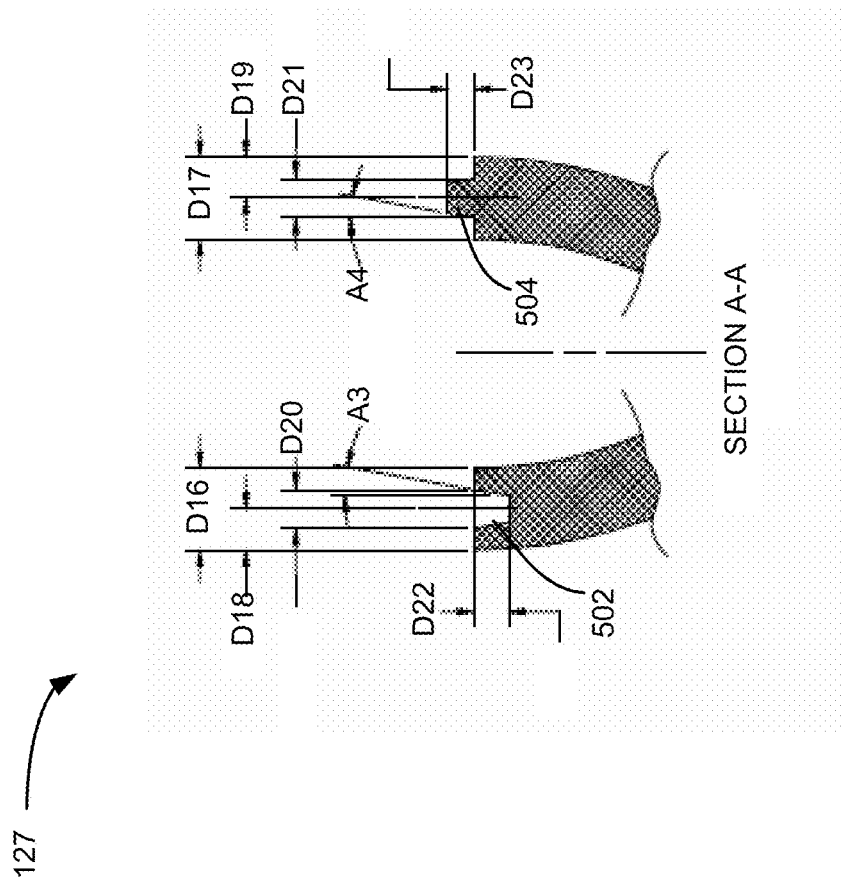

Similar to the discussion above with respect to male side 110, one of connections areas 128 may include a groove and the other of connection areas 128 may include an extension. For example, FIG. 5B illustrates a partial cross-section of half 127 of FIG. 5A taken along line AA. Referring to FIG. 5B, groove 502 may have a tapered or trapezoidal shape, with A3 representing the angle of the sides of the walls of groove 502. In an exemplary implementation, A3 may range from about 5 degrees to about 15 degrees. Correspondingly, extension 504 is similarly angled to have a trapezoidal shape as illustrated in FIG. 5B such that it can be received in a groove located in half 126. Therefore, A4 which represents the angle of the side walls of extension 504 may be equal to A3 and may range from about 5 degrees to about 15 degrees. In one implementation, A3 and A4 may be approximately 10 degrees.

Referring to FIG. 5B, D16 and D17 represent the width of the walls of half 127, D18 and D19 represent the distance from the outside wall of half 127 to the center of groove 502 and the center of extension 504, respectively, D20 and D21 represents the maximum width of groove 502 and extension 504, respectively, D22 represents the depth of groove 502, and D23 represents the height of extension 504. In an exemplary implementation, D16 and D17 may be equal to each other and may range from approximately 0.15 inches to 0.30 inches, D18 and D19 may be equal to each other and may range from approximately 0.05 inches to 0.15 inches, D20 and D21 may be equal to each other and may range from approximately 0.05 inches to 0.15 inches, D22 may range from approximately 0.05 inches to 0.10 inches and D23 may range from approximately 0.05 inches to 0.10 inches. In one exemplary implementation, D16 and D17 may be 0.187 inches, D18 and D19 may be 0.094 inches, D20 and D21 may be 0.090 inches, D22 may be 0.080 inches, and D23 may be 0.060 inches. Similar to the discussion above with respect to FIGS. 3A-3D, the dimensions described above with respect to D16-D23, A3 and A4 are exemplary only. It should be understood that other dimensions may be used for D16-D23, A3 and A4 based on the particular implementation.

Similar to the discussion above with respect to FIGS. 3A-3D, an extension in half 126 (not shown) may fit in groove 502 and extension 504 may fit in groove in half 126. As a result, sides 126 and 127 may be secured to each other via friction in a dove-tail like connection. These connections, however, may be easily separated when cold shrink core 100 is to be removed from electrical wires/connection, as described in more detail below.

FIG. 6A is a side view of female side 120 and FIG. 6B is a side view of half 126 of female side 110 consistent with an exemplary implementation. Referring to FIG. 6A, L8 may represent the length of female side 120, L9 may represent the width of slot 129, L10 may represent the distance from the end of side 126 to the far side of slot 129, and R5 may represent the radius of curvature of slot 129. In an exemplary implementation, L1 may range from approximately 4.5 inches to approximately 8.0 inches, L9 may range from approximately 0.05 inches to 0.10 inches, L10 may range from approximately 0.15 inches to approximately 0.25 inches, and R5 may range from approximately 0.03 inches to 0.06 inches. In one particular implementation, L8 may be 4.5 inches, L9 may be 0.093 inches, L10 may be 0.219 inches and R5 may be 0.046 inches. The dimensions described above with respect to L8-L10 are exemplary only. It should be understood that other dimensions may be used for L8-L10 and R5 based on the particular implementation.

Referring to FIG. 6A, D16 may represent the outer diameter of female side 120 and D17 may represent the inner diameter of female side 120. In an exemplary implementation, D16 may range from approximately 1.6 inches to approximately 3.2 inches and D17 may range from approximately 1.2 inches to 2.8 inches. In one particular implementation, D16 may be 1.664 inches and D17 may be 1.289 inches. Similar to the discussion above with respect to L8-L10, the dimensions described above with respect to D16 and D17 are exemplary only. It should be understood that other dimensions may be used for D16 and D17 based on the particular implementation.

As described above, in an exemplary implementation, female side 120 may include two separable portions or halves 126 and 127 that fit together via connections 128. FIG. 6B illustrates half 126 of female portion 120 rotated 90 degrees with respect to the center line shown in FIG. 6A. Referring to FIG. 6B, half 126 may include extension 506 that extends from one side of half 126 along the majority of the length of half 126. The opposite side of half 126 may include a groove that runs the majority of the length of half 126, as illustrated by connection area 128 in FIG. 6A. FIG. 6C illustrates a cross-section of half 126 taken along line CC in FIG. 6C. As illustrated, one side of half 126 includes extension 506 and the opposite side of half 126 includes groove 508. Extension 506 and groove 508 may be configured in a manner similar to extension 504 and groove 502, respectively. In addition, the dimensions with respect to extensions 506 and groove 508 and the side walls of half 126 may be the same as those discussed above with respect to their corresponding elements in half 127 discussed above in FIG. 5B.

Similar to the discussion above with respect to male half 110, extension 506 may fit in groove 502 and extension 504 may fit in groove 508. As a result, sides 126 and 127 may be secured to each other via friction in a dove-tail like connection. These connections, however, may be easily separated when cold shrink core 100 is to be removed from an electrical cable, as described in more detail below. Referring to FIG. 6C, D18 may represent one half the length of slot 129. In an exemplary implementation, D18 may range from approximately 0.3 inches to 0.5 inches (e.g., 0.412 inches).

FIG. 6D illustrates a cross-sectional view of half 126 looking toward receiving end 122. As illustrated, half 127 includes groove 508 and extension 506. Half 126 also includes raised portions 610 and 620 (also referred to herein as cam portions or cams 610 and 620) that extend from the sides of receiving portion 122 in a radial direction toward the inner portion of rim 122. Fingers 112 of male portion 110 are configured to be located adjacent cams 610 and 620 when male portion and female portion are in the connected position illustrated in FIG. 2. When an installer wants to separate male portion 110 and female portion 120, the installer may rotate female side 120 with respect to male side 110. When this occurs, cams 610 and 620 contact fingers 122 and operate to push fingers 112 inwardly to release male side 110 from female side 120, as described in more detail below.

Figure 6E:
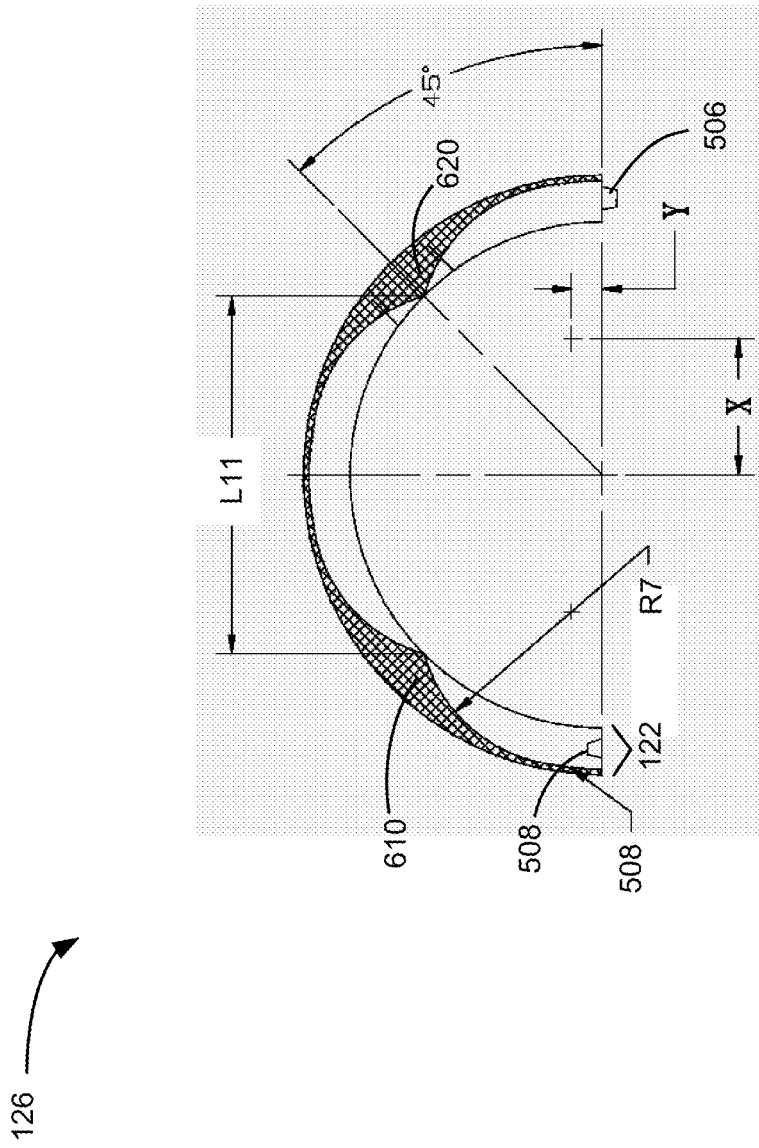

FIG. 6E illustrates a sectional view of half 126 taken along line BB of FIG. 6A. Referring to FIG. 6E, half 127 includes extension 506 and groove 508. Rim 122 also includes cams 610 and 620 located along the circumference of rim 122. As illustrated, cams 610 gradually slope toward the inner surface of rim 122. Referring to FIG. 6E, L11 represents the distance between the center portions of cams 610 and 620 and R7 represents the radius of curvature of cams 610 and 620. In an exemplary implementation, L11 may range from approximately 0.40 inches to 1.0 inches and R7 may range from about 0.30 inches to about 0.65 inches. In one implementation, L11 may be 0.456 inches and R7 may be 0.375 inches. Referring to FIG. 6E, the point defined by X and Y represents the center point of the radius of curvature of cam 620. In an exemplary implementation, X may range from approximately 0.40 inches to approximately 0.90 inches and Y may range from approximately 0.05 inches to approximately 0.40 inches. In one exemplary implementation, X may be 0.427 inches and Y may be 0.082 inches. Similar to the discussion above with respect to FIGS. 3A-6D, the dimensions described above with respect to L11, R7, X and Y are exemplary only. It should be understood that other dimensions may be used for L11, R7, X and Y based on the particular implementation. In addition, half 127 may include cams that are similar to cams 610 and 620 illustrated in FIG. 6E.

Figure 7A:
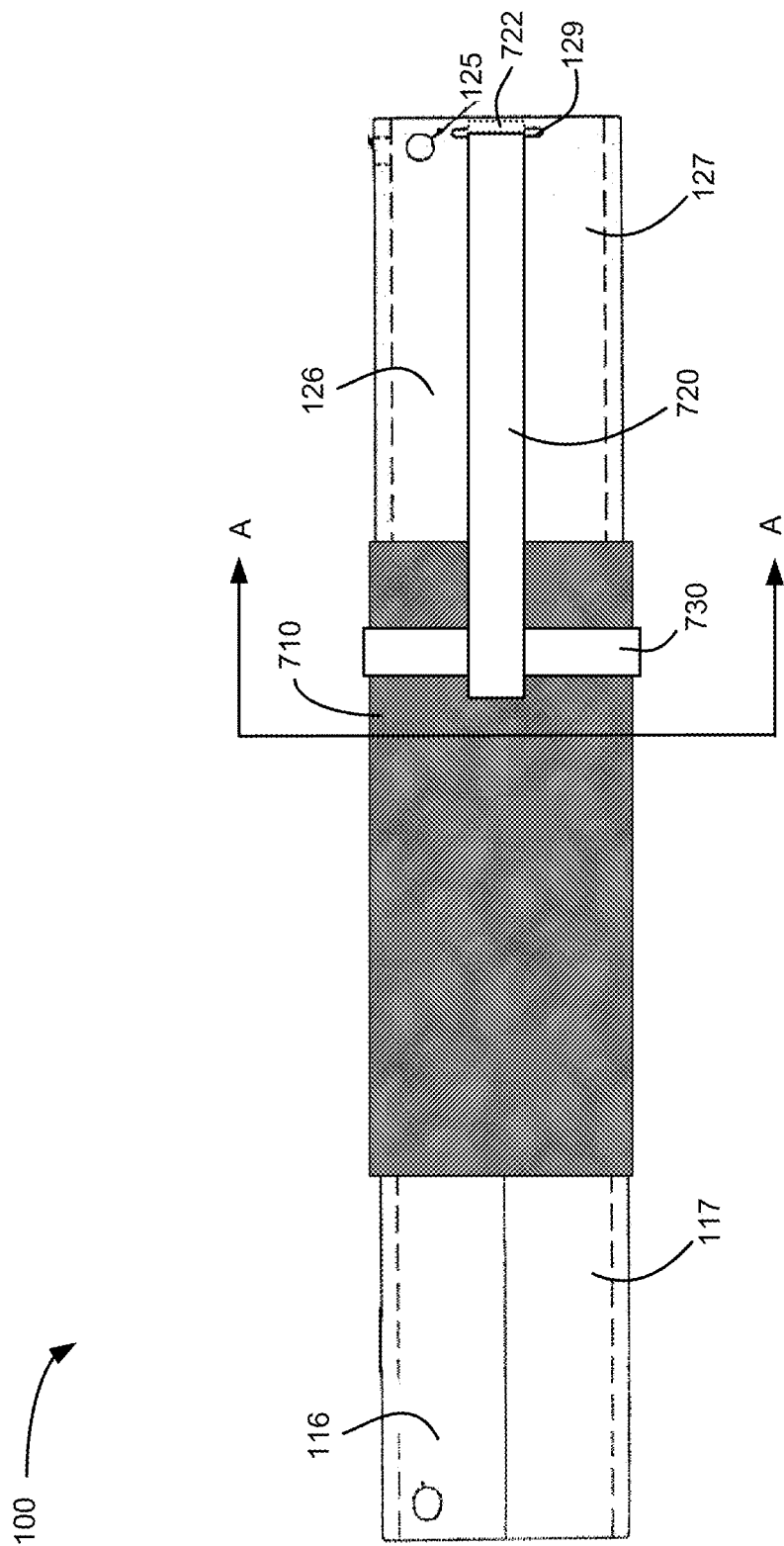
FIG. 7A is a side view of the connected cold shrink core of FIG. 2 with an insulating material formed on the cold shrink core.

Referring back to FIG. 2, when male portion 110 is connected to female portion 120, an insulating material may be disposed over cold shrink core 100. For example, FIG. 7A illustrates cold shrink core 100 with insulating material 710 (also referred to herein as cold shrink material 710) stretched over a portion of cold shrink core 100. In an exemplary implementation, insulating material 710 may be elastic such that when portions 110 and 120 are separated, insulating material 710 may shrink over, for example, an electrical splice to insulate the splice. FIG. 7A also illustrates strap 720 and buckle 730 that may be used to secure female portion 120 to insulating material 710, when male portion 110 is separated from female portion 120. Strap 720 may be fed through slot 129 and out the end of female portion 120. For example, portion 722 shown via the dotted lines in FIG. 7A is a portion of strap 720 fed through one side of slot 729, through the end of female portion 120 and back over the other portion of strap 720 located along the length of female portion 120. One end of strap 720 may be secured to the opposite end of strap 720 via, for example, Velcro or some other fastener, such that strap 720 forms a loop on one side of female side 110. In addition, a single strap 720 is illustrated in FIG. 7A. In an exemplary implementation, the opposite side of female portion 120 may include a similar strap 720 fed through slot 129 to form a loop on the opposite side of female side 120. In such an implementation, each strap 720 may form a loop that is approximately 6 to 8 inches in length that may be secured via buckle 730 or other securing mechanisms.

For example, buckle 730 may be fed through the loop of each strap 720 to secure female portion 120 to cold shrink material 710. That is, buckle 730 may be located between the sides of each of straps 720 such that buckle 730 may aid in securing straps 720 to cold shrink material 710. In an exemplary implementation, buckle 730 may be made from Velcro and encircle the circumference of female side 120 and aid in securing straps 720 and cold shrink material 710 to female side 120 when male side 110 is separated from female side 120. In other implementations, other elastic or semi-elastic materials may be used for straps 720 and buckle 730.

Figure 7B:
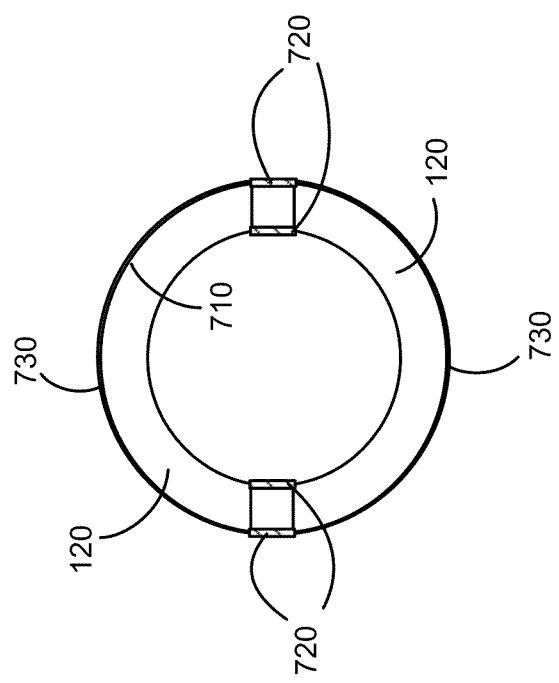
FIG. 7B is an exemplary sectional view of a portion of the cold shrink core of FIG. 7A.

FIG. 7B illustrates a cross-sectional view of female portion 120 taken along line AA of FIG. 7A. As illustrated, straps 720 may loop over female portion 120. Buckle 730, shown as the heavier weighted line around the circumference of female portion 120 loops around the circumference of female portion 120 over top of insulating material 710. Buckle 730, as discussed above, may be fed through the loops of straps 720 and tightened radially over insulating material 710. For example, as described above, in an exemplary implementation, buckle 730 may be made from Velcro and the installer may simply removing the initial Velcro connection and tighten buckle 730 to the desired tightness. Straps 720 may be positioned based on the location of the splice upon which insulating material 710 will be deposited, as described in detail below.

As described above, cold shrink core 100 may be placed or slid on a cable in which wires and/or a splice will receive cold shrink insulating material 710. After cold shrink core 100 is placed in the appropriate location, the installer may rotate female portion 120 with respect to male portion 110 (or vice versa). This action may cause cams 610 and 620 located on half 126 and similarly configured cams located on half 127 to engage and push fingers 112 inwardly to release male side 110 from female side 120.

Figure 8B:
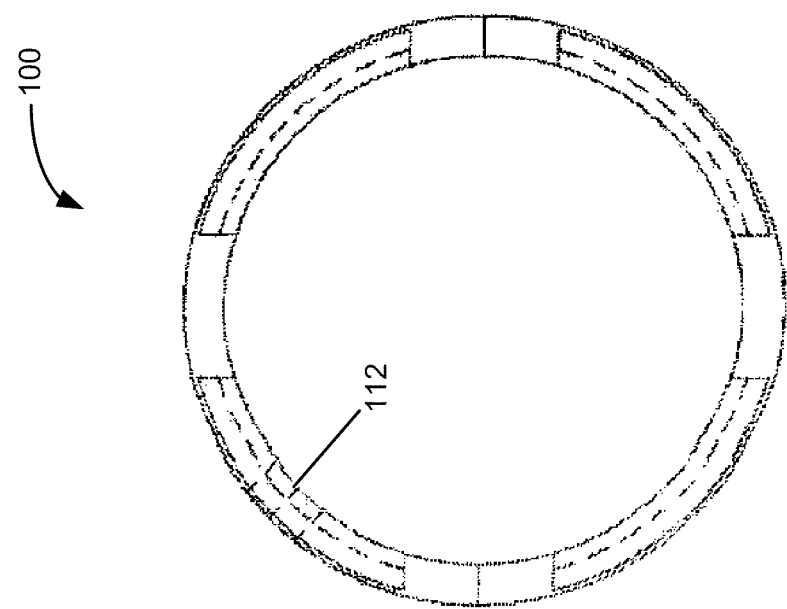
FIGS. 8A and 8B are sectional views of the cold shrink core of FIG. 2 before and after rotation of one of the sides.
Figure 8A:
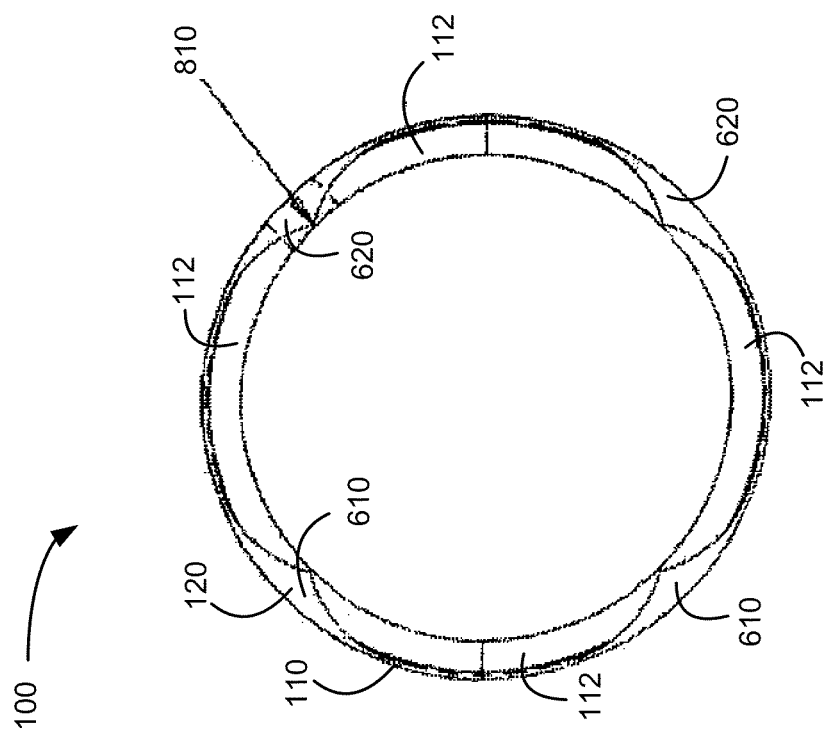

For example, FIG. 8A illustrates a cross-sectional view of sides 110 and 120 coupled together. As illustrated in FIG. 8A, an installer may rotate side 120 with respect to side 110 (or vice versa) to the point illustrated as point 810. At this point, cams 610 and 620 may push fingers 112 inwardly to release sides 110 and 120 from one another, as illustrated in FIG. 8B.

Figure 9A:
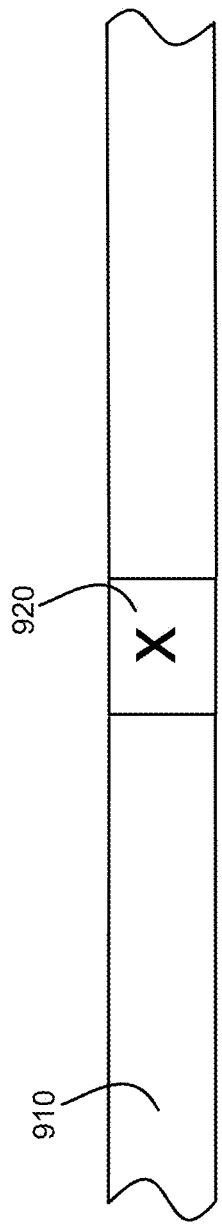
FIGS. 9A-9E schematically illustrate use of the cold shrink assembly of FIG. 7.
Figure 9B:
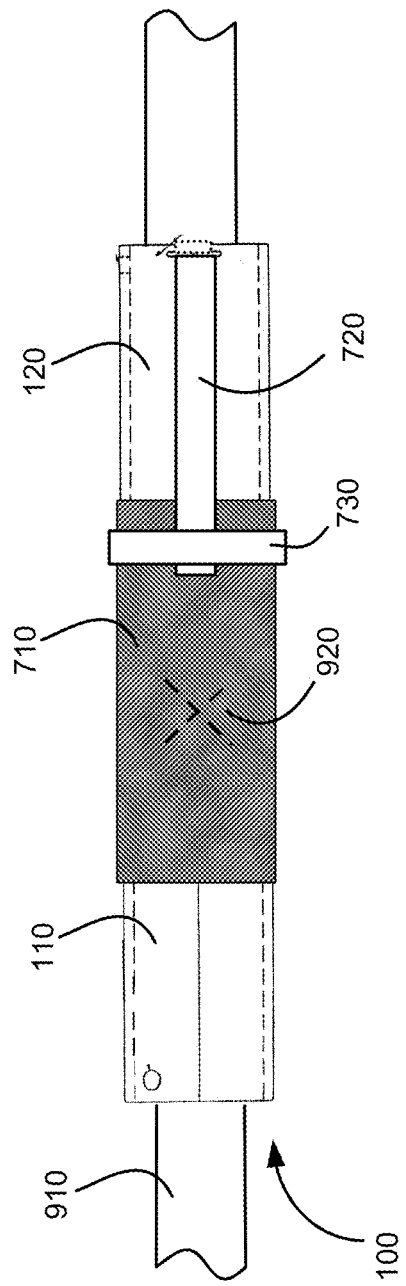

FIGS. 9A-9E illustrate use of cold shrink core 100 to deposit insulation over a splice or other electrical connection. Referring to FIG. 9A, cable 910 may include an electrical spice represented by the "X" at area 920, also referred to herein as splice 920. An installer may place cold shrink core 100 over cable 910 and slide cold shrink core 100 toward the splice at area 920 such that insulating material 710 is located over the splice (indicated by the dotted X in FIG. 9B). Strap 720 may be looped through slot 129 on each side of female portion 120. In an exemplary implementation, buckle 730 may be fed through the two loops of straps 720 approximately four to five inches from the end of the splice 920. One end of the loop of each strap 720 may be located on one side of buckle 730 and the other end of the loop of each strap 720 may be located on the other side of buckle 730. The installer may tighten buckle 730 radially around female portion 120. For example, as described above, in one implementation, buckle 730 may be made from Velcro and the installer may simply removing the initial Velcro connection and tighten buckle 730 to the desired tightness. The installer may also re-tighten straps 720, which may also be made from Velcro, followed by re-tightening buckle 730 to ensure that straps 720 and buckle 730 are adequately secured to female portion 120.

Figure 9C:
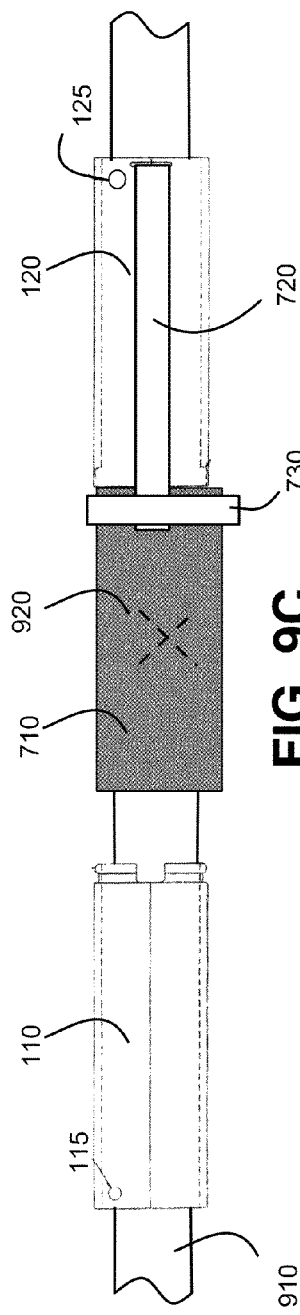
Figure 9D:
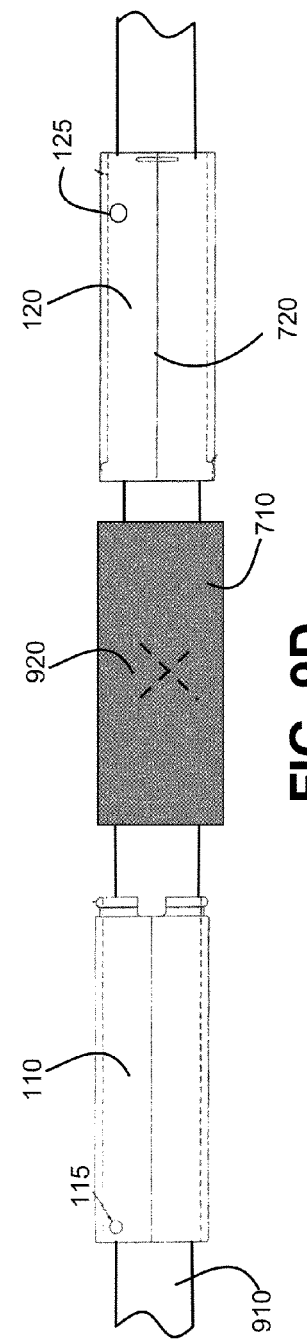

The installer may then rotate female portion 120 with respect to male portion 110 such that positioning hole 115 is aligned with positioning hole 125. In an exemplary implementation, to unlock or release male portion 110 from female portion 120, female portion 120 may be rotated by 10 degrees to 15 degrees with respect to male portion 110 (or vice versa). In some implementations, female portion 120 may be rotated using a tool, such as a spanner wrench. In other implementations, female portion 120 may be rotated by hand, without the use of tool. In either case, once positioning holes 115 and 125 are aligned, cams 610 and 620, as well as similarly positioned cams located on half 127 of female portion 120 may contact fingers 112 and press fingers 112 inwardly. Such force will cause fingers 112 to release or disengage from receiving end 122 of female portion 120, as illustrated in FIG. 9C. Male portion 110 and female portion 120 are then separated. When male portion 110 separates from female portion 120, one side of insulating material 710 may drop over and contract over a portion of splice 920. Straps 720 and buckle 730, however, may hold the remaining portion of insulating material 710 to allow the installer to correctly position insulating material 710 over splice 920. When the insulating material 710 is properly positioned, the installer may remove straps 720 and buckle 730. When this occurs, cold shrink material 710 may drop over and contract over splice 920 to insulate splice 920, as illustrated in FIG. 9D.

Figure 9E:
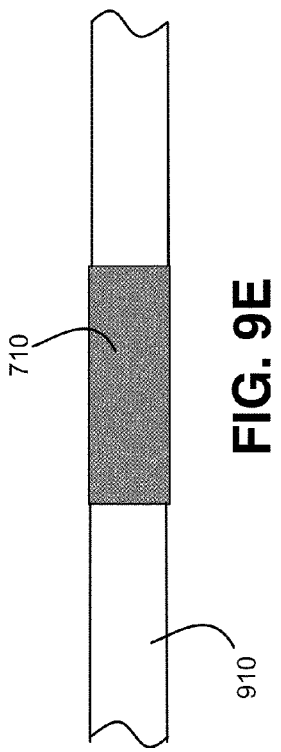

The installer may then disengage half 116 from half 117 of male portion 110. For example, as discussed above, halves 116 and 117 may include extensions and corresponding mating grooves that allow halves 116 and 117 to stay together. Once male portion 110 is removed from female portion 120 and insulating material 710, halves 116 and 117 may be separated from one another by applying a small force, and without the use of a tool, to pull one of halves 116 or 117 from the other half. Similarly, halves 126 and 127 may be separated from each other by application of a small amount of force (and without the use of a tool) to separate the two halves. Halves 116 and 117 and halves 126 and 127 may then be removed from cable 910, resulting in the installed cold shrink electrical material 710 formed over the splice, as illustrated in FIG. 9E.

In this manner, cold shrink assembly 100 may allow an installer to easily install the cold shrink material (e.g., insulating material 710) at the desired location and simply remove the cores from the cable. This may allow the installer to save significant time with respect to insulating a splice or other electrical connection.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, implementations described above refer to fingers 112 interlocking with receiving end that includes cams 610 and 620. In other implementations, fingers 112 and cams 610 and 620 may have other shapes, sizes, etc., and/or other types of interlocking mechanisms may be used. For example, fingers 112 of male portion 110 may include any tab-like extensions that interlock with slots or other mechanisms on female portion 120 in an alternative implementation. In this case, rotation and/or pushing of male portion 110 with respect to female portion 120 may release male portion 110 from female portion 120. In still other implementations, male portion 110 may connect to female portion 120 via other types of overlapping and/or interlocking structures that secure portions 110 and 120 together.

In addition, implementations described above refer to using straps 720 and buckle 730 to aid in positioning cold shrink assembly 100. In other implementations, other mechanisms may be used to aid in securing and positioning cold shrink material 710 prior to releasing cold shrink material 710 over the splice or other desired location. In still other implementations, straps 720 and buckle 730 may not be used and as a result, slot 129 may also not be needed. In such implementations, once male portion 110 is separated from female portion 120, cold shrink material 710 may drop and contract over the splice or other electrical connection.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A cold shrink assembly, comprising:
    a first member comprising first and second portions that are coupled together and configured to be separable from each other, the first and second portions including a main body having curved portions extending from a first end of the main body;
    a second member comprising third and fourth portions that are coupled together and configured to be separable from each other, the third and fourth portions including forming a receiving portion located at a second end of the second member, wherein the receiving portion is configured to:
        secure the curved portions of the first member to the receiving portion when the first and second members are in a first position, and
        release the curved portions from the receiving portion when the first and second members are in a second position; and
    an insulating material disposed over a portion of the first and second members.

2. The cold shrink assembly of claim 1, wherein when in the first position, the first member is at a first radial position with respect to the second member, and when in the second position, the first member is at a second radial position with respect to the second member, the second radial position being rotated with respect to the first radial position.

3. The cold shrink assembly of claim 2, wherein the first member includes a first positioning indicator and the second member includes a second positioning indicator, wherein when in the second position, the first and second positioning indicators are aligned with respect to each other.

4. The cold shrink assembly of claim 1, wherein the first and second members each comprise a plastic material that is substantially cylindrical in shape.

5. The cold shrink assembly of claim 1, wherein the receiving portion comprises a rim having a plurality of cam portions located around the periphery of the rim, the cam portions extending in the radial direction from the periphery of the rim.

6. The cold shrink assembly of claim 5, wherein the curved portions comprise fingers and the cam portions are configured to apply a force to push the fingers of the first member inwardly when the second member is rotated with respect to the first member, the force causing the first member to separate from the second member.

7. The cold shrink assembly of claim 1, wherein the first portion of the first member comprises:
    a first extension that runs along a first side of the first portion, and
    a first groove that runs along a second side of the first portion,
    wherein the second portion of the first member comprises:
        a second groove that runs along a first side of the second portion, and
        a second extension that runs along a second side of the second portion, wherein the first extension is received by the second groove and the second extension is received by the second groove to secure the first portion to the second portion, and
    wherein the first extension includes angled sides, and the second groove includes correspondingly angled sides to hold the first and second portions together.

8. The cold shrink assembly of claim 1, wherein the second member further comprises at least one slot, the cold shrink assembly further comprising:
    at least one strap configured to be fed through the at least one slot and form a loop; and
    a buckle located at the second end of the second member and disposed around a circumference of the second member, wherein the at least one strap and the buckle are configured to secure the insulating material when the first member is disconnected from the second member.

9. The cold shrink assembly of claim 1, wherein the first and second portions are separable by hand and without the use of a tool.

10. A cold shrink assembly, comprising:
    a first member comprising a main body having at least one portion extending from a first end of the main body;
    a second member comprising a receiving end located at a second end of the second member, wherein the receiving end is configured to:
        hold the at least one portion extending from the first end of the main body when the first and second members are in a first position with respect to each other, and
        release the at least one portion when one of the first or second members are rotated with respect to the other of the first or second members; and
    an insulating material disposed over a portion of the first and second members.

11. The cold shrink assembly of claim 10, wherein the first position corresponds to a locked position and the second position corresponds to an unlocked position, the second position being rotated at least 10 degrees with respect to the first position.

12. The cold shrink assembly of claim 11, wherein the first member includes a first positioning hole and the second member includes a second positioning hole, wherein when in the unlocked position, the first and second positioning holes are aligned with respect to each other.

13. The cold shrink assembly of claim 10, wherein the receiving end comprises a rim having a plurality of raised portions located around the periphery of the rim, the raised portions extending in the radial direction from the periphery of the rim.

14. The cold shrink assembly of claim 13, wherein the at least one portion comprises a plurality of extensions, and the raised portions are configured to apply a force to push the plurality of extensions inwardly when the second member is rotated with respect to the first member, the force causing the first member to separate from the second member.

15. The cold shrink assembly of claim 10, wherein the first member comprises first and second portions that are coupled together and are configured to be separable from each other, and the second member comprises third and fourth portions that are coupled together and are configured to be separable from each other, wherein the first and second portions of the first member are coupled to each other using extensions and corresponding grooves that are connected to each other in a dove-tail configuration.

16. The cold shrink assembly of claim 10, further comprising:

a strap configured to form a loop along one side of the second member; and a buckle located near the second end of the second member and disposed around a circumference of the second member, wherein the strap and buckle are configured to secure the insulating material when the first member is disconnected from the second member.

17. The cold shrink assembly of claim 10, wherein the first and second members each comprise a substantially cylindrical, hollow tube.

18. The cold shrink assembly of claim 10, wherein the first and second members are separable by hand and without the use of a tool.

19. A method, comprising:

placing a cold shrink assembly onto an electrical cable, the cold shrink assembly including a first side and a second side;

positioning the cold shrink assembly at a location to receive insulating material disposed on the outer surface of the cold shrink assembly;

rotating the first side of the cold shrink assembly with respect to the second side to separate the first side from the second side and to deposit the insulating material; and removing the first and second sides from the electrical cable.

20. The method of claim 19, wherein the removing the first and second sides comprises:

separating a first half of the first side from a second half of the first side, and separating a first half of the second side from a second half of the second side.

* * * * *

UNITED STATES PATENT AND TRADEMARK OFFICE
CERTIFICATE OF CORRECTION

| | |
|---|---|
| PATENT NO. | : 8,853,563 B2 |
| APPLICATION NO. | : 13/085691 |
| DATED | : October 7, 2014 |
| INVENTOR(S) | : Dennis Verner et al. |

It is certified that error appears in the above-identified patent and that said Letters Patent is hereby corrected as shown below:

In the Claims

In claim 1, at column 11, line 46, change the phrase "forming a receiving portion" to "a receiving portion".

Signed and Sealed this
Third Day of March, 2015

Michelle K. Lee
*Deputy Director of the United States Patent and Trademark Office*